April 3, 1962  E. R. DYE  3,028,200
SAFETY HARNESS
Filed July 10, 1959  2 Sheets-Sheet 1
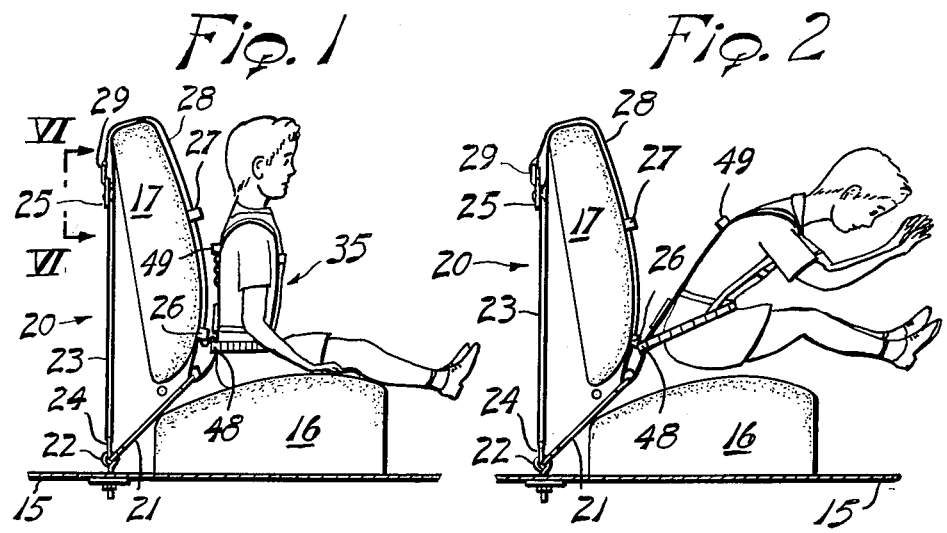
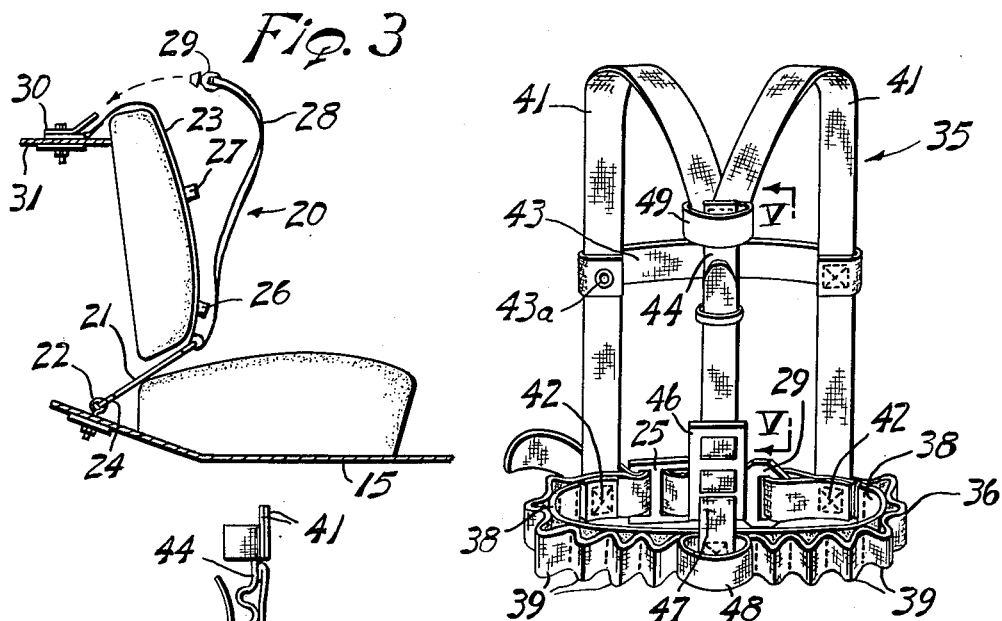
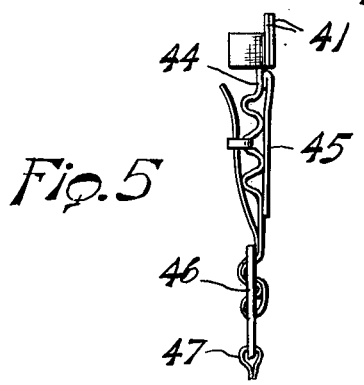
INVENTOR.
Edward R. Dye
BY
Beau, Brooks, Buckley & Beau April 3, 1962 E. R. DYE 3,028,200
SAFETY HARNESS
Filed July 10, 1959 2 Sheets-Sheet 2
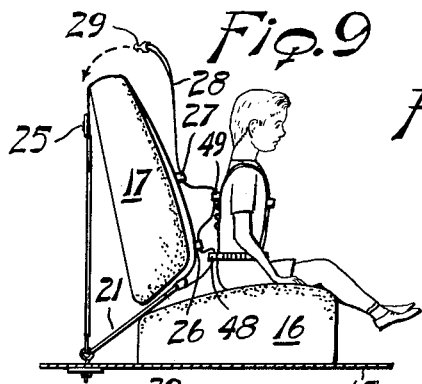
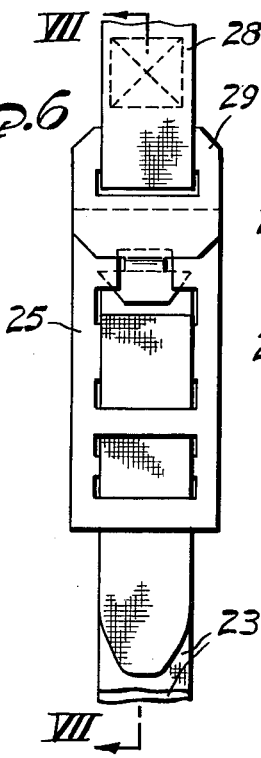
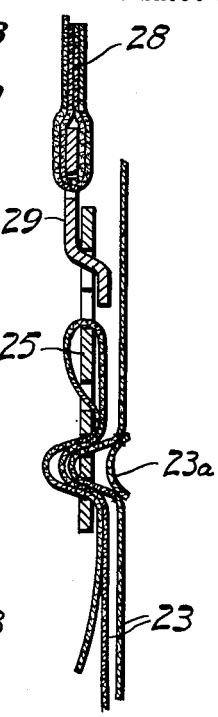
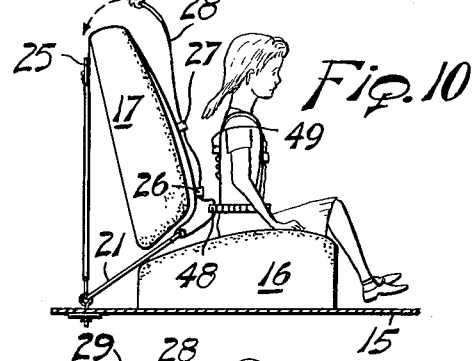
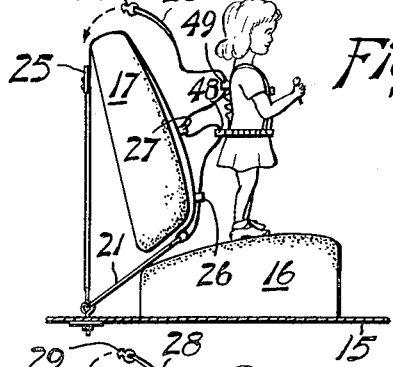
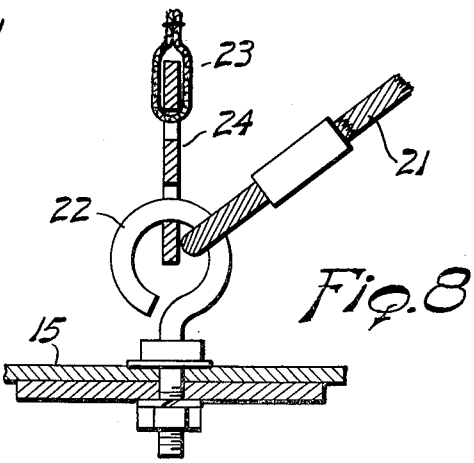
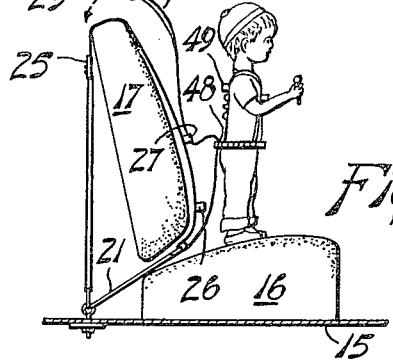
INVENTOR.
Edward R. Dye
BY
Bean, Brooks, Buckley & Bean

United States Patent Office 3,028,200
Patented Apr. 3, 1962

3,028,200
SAFETY HARNESS
Edward R. Dye, 540 S. Buffalo Road, Orchard Park, N.Y.
Filed July 10, 1959, Ser. No. 826,256
1 Claim. (Cl. 297—389)

This invention relates to safety harnesses and more particularly to such harnesses for use in protecting children from injury while riding in automobiles.

The many hazards associated with carrying small children as passengers in automobiles are well known and too much discussed to need amplification here. Likewise the value of the safety belt or harness is well recognized as being probably the best single answer to passenger safety in nearly all types of vehicles. A great deal of time and money have been spent in attempting to develop a truly satisfactory safety harness but prior devices which offer a reasonable degree of safety have often been unduly restricting during normal vehicle operation and/or awkward enough to get into that they are apt often to go unused a great deal of the time. Additionally, many so-called safety harnesses and belts are so poorly designed as to offer little more protection than no belt at all, and in some cases actually create hazards of their own such as by having their body restraining portions exert heavy loads on vulnerable portions of the body during violet deceleration of the vehicle in which used.

One object of the present invention is to provide an improved safety harness as aforesaid which will offer an optimum degree of safety and/or restraint when required, such as during sudden stoppage of a vehicle, and at the same time offer a reasonable degree of freedom of movement for the passenger during normal travel.

Another object of the invention is to provide a harness as aforesaid which is selectively adjustable to provide different degrees of freedom of movement of the passenger as may be desirable for different traveling conditions, size of the passenger, or other reasons.

Still another object of the invention is to provide such a harness which is relatively easily attached to the vehicle and to the passenger.

Other objects and advantages of the safety harness of the invention will appear from the description hereinbelow and the accompanying drawing wherein;

FIG. 1 is a side elevational view showing a harness of the invention in use during normal travel of the vehicle;

FIG. 2 corresponds to FIG. 1 but shows the effect on the harness and passenger of rapid vehicle deceleration;

FIG. 3 shows an arrangement for mounting the harness on the rear seat of an automobile;

FIG. 4 is a rear perspective view of the portion of the harness to be worn by the passenger;

FIG. 5 is a side elevational view taken on line V—V of FIG. 4;

FIG. 6 is a fragmentary elevational view taken on line VI—VI of FIG. 1 showing a buckle portion of the harness;

FIG. 7 is a sectional view taken on line VII—VII of FIG. 6;

FIG. 8 is a fragmentary side elevational view partly in section, showing details of the harness mounting; and FIGS. 9, 10, 11 and 12 are side elevational views showing the harness in various positions of adjustment.

The form of the safety harness of the invention shown in the drawings comprises two basic units, the seat strap 20 and the body harness 35. The seat strap portion 20 is mounted on the front seat of a vehicle as shown in FIG. 1. Numeral 15 indicates the floor of the vehicle; 16 designates the seat cushion, and 17 is the back rest. The strap device 20 includes a wire cable anchor strap 21 fixed through an eye bolt 22 which is shown bolted through the floor 15 in conventional manner. A fixed web 23 is attached at one end to the anchor strap 21 and passes over the back rest 17, loops through a simple slotted plate 24 attached to the eye bolt 22 and returns to thread through a buckle plate 25 (as shown in detail in FIGS. 6 and 7) which is fixed to the fixed web 23 by means of a sewn tab 23a. Thus the fixed web is firmly anchored to the vehicle at 22 and is readily adjustable by the buckle arrangement to suit different sized seats and to the desired tension. Restraining loops 26, 27, whose function will be explained hereinbelow, are firmly joined, as by sewing, to the fixed web 23 where shown. The seat strap assembly 20 also includes an attaching web 28 which has its lower end fixed to the anchor strap 21 and has at its other end a buckle hook 29 adapted to lock into the buckle plate 25 (FIGS. 6-7) which is fixed to the fixed web 23 behind the top of the back rest as shown.

The fixed web 23 may be modified for rear seat installations as shown in FIG. 3. In this case a terminal bracket 30 is mounted on the rear deck 31 behind the back rest 17, and the fixed web 23 is fastened to the bracket 30 in lieu of the eye bolt 22. The terminal bracket 30 is also provided with a slot to receive the buckle hook 29 of the attaching web 28.

The body harness portion 35 of the safety harness of the invention, shown in detail in FIGS. 4 and 5, includes a belt 36 of very strong, inelastic material provided with any suitable buckle such as a buckle plate 25 and buckle hook 29 as shown in FIGS. 1–3, 6 so that the belt may be adjusted to fit passengers of different sizes while being easily, but not inadvertently, released and/or buckled. At each side of the belt 36, short lengths of elastic material 38—38 are sewn to the inner surface thereof so as to cause the belt, when not under tension, to be gathered in short folds as indicated at 39. The purpose of this feature will be explained hereinbelow.

A pair of shoulder straps 41, 41 are fixed at their lower ends as by sewing to the belt 36 as indicated at 42, 42, and their upper ends converge and are sewn to the upper end of a back strap 44 as shown. To aid in keeping the shoulder straps 41—41 in proper position on the wearer, a chest strap 43, is sewn to one shoulder strap and is arranged to be snap attached to the other, as indicated at 43a. The back strap 44 has a length of elastic 45 (FIG. 5) sewn to the inside thereof to cause the strap 44 to normally fold as in the same manner as the belt 36. The lower end of the back strap 44 is threaded through an adjusting anchor plate 46 which in turn is fixed to the center rear portion of the belt 36 by means of a loop of webbing 47 sewn to the belt as shown. Thus the belt and the back and shoulder straps are all adjustable to fit the wearer. Restraining loops 48 and 49 are sewn to the belt and back strap respectively, to complete the harness assembly 35.

Thus it will be readily apparent that with the illustrated construction of the seat strap 20 and the body harness 35, a passenger may be effectively held in the seat of the vehicle with a selected degree of freedom dependent upon what order and combination of restraining loops 26, 27, 48, 49 the attaching web 28 is threaded through, before fastening the buckle hook 29 into the buckle plate 25. For example, in FIG. 9 the attaching strap 28 is shown fed through the restraining loop 48 on the harness 35 and then through the loop 26 on the fixed strap 23 then through the loop 49 on the harness, and then through loop 27 on the fixed strap. Under this arrangement, when the attaching web 28 is made fast to 25, the passenger will be held substantially to an upright seated position. In FIG. 10, where the web 28 is not passed through the loop 49, the passenger is held to a sitting position, but is free to bend forward or to lean to either side. For smaller children, who often rebel unless allowed to ride standing up, the arrangements of FIGS. 11 and 12 which show the web 28 passing through loop 26 and then loop 48, are useful. This allows the passenger to stand up and is still a safe position for small children who will not strike the dashboard or roof of the car before being snubbed by the loop 48 contacting the loop 27. If desirable, additional restriction of movement may be attained by passing the web 28 through loop 48 on the harness. This will keep the child in an upright position with its back against the back rest 17. In FIG. 12, the child is free to stand up, sit down, or even lie down.

It is an important feature of the improved safety harness of the invention that in normal riding position the belt and shoulder straps are resiliently held in snug but comfortable position around the passenger's waist and shoulders by the elastic portions 38 and 45. However, when the passenger is pitched forwardly and upwardly relative to the seat responsive to sudden decelerations of the vehicle the elastic parts give so as to in effect somewhat loosen relative to the passenger's body, whereby the belt angle relative to the body is permitted to change as shown in FIG. 2 compared to FIG. 1. This causes the restraining forces to be concentrated across the pelvic structure and shoulders of the passenger rather than at the waist line which almost eliminates the possibility of injury to the passenger by the harness which often happens with other types of safety devices.

Another feature of the safety harness of the invention is of utmost importance for front seat installations where the back rest is of the type which folds forward to allow entry to the rear seat of the vehicle. With the seat strap installed, the back rest may still be pushed forwardly and will slide within the encircling strap but, due to the geometry of the straps, the seat cannot be pulled forward by pulling on the front of the straps. In fact, the harder the pull on the straps, the firmer the back rest is held in place. Thus under load conditions such as shown in FIG. 2, the seat is restrained from being thrown forward by inertial force, thereby eliminating a common contributory cause of injury.

It is to be understood that certain changes and modifications in the safety harness as illustrated and described may be made without departing from the spirit of the invention or the scope of the following claim.

I claim:

A safety harness device for a vehicle seat including an anchor portion and a body harness portion, said anchor portion comprising a fixed strap device vertically encircling the seat back and fixed at its opposite ends to said vehicle, said strap having a plurality of eye devices fixed thereto spaced vertically thereof and having a free strap portion adapted to extend parallel thereto and to be selectively threaded through said eye devices and then detachably fastened to said strap device at its free end portion, said harness portion including a belt member, shoulder strap members extending from the front portion of said belt vertically over the shoulders of the passenger and into a downwardly extending back strap portion, connecting to the rear of said belt, said back strap portion having vertically spaced eye devices fixed thereto, whereby said harness portion may be coupled to said anchor portion by threading said free strap portion selectively through different of said eye devices before buckling said free strap to said fixed strap to provide various passenger restraining arrangements.

References Cited in the file of this patent

UNITED STATES PATENTS

| 2,871,927 | Materi | Feb. 3, 1959 |
| 2,888,063 | Rose | May 26, 1959 |

FOREIGN PATENTS

| 207,664 | Australia | Jan. 31, 1957 |

OTHER REFERENCES

Mechanix Illustrated (vol. 48, No. 6, p. 88), April 1953.